US009511856B2

(12) United States Patent
Mercer et al.

(10) Patent No.: US 9,511,856 B2
(45) Date of Patent: *Dec. 6, 2016

(54) EMERGENCY COLLECTIVE ACTUATOR AND METHOD FOR A HELICOPTER

(71) Applicant: Merlin Technology Inc., Kent, WA (US)

(72) Inventors: John E. Mercer, Gig Harbor, WA (US); Mark H. Marvin, Tacoma, WA (US)

(73) Assignee: Merlin Technology Inc., Kent, WA (US)

( * ) Notice: Subject to any disclaimer, the term of this patent is extended or adjusted under 35 U.S.C. 154(b) by 395 days.

This patent is subject to a terminal disclaimer.

(21) Appl. No.: 14/562,479

(22) Filed: Dec. 5, 2014

(65) Prior Publication Data

US 2016/0251078 A1   Sep. 1, 2016

Related U.S. Application Data

(63) Continuation of application No. 14/161,877, filed on Jan. 23, 2014, now Pat. No. 8,910,909, which is a continuation of application No. 13/479,130, filed on May 23, 2012, now Pat. No. 8,651,425, which is a continuation-in-part of application No. 12/953,294, filed on Nov. 23, 2010, now Pat. No. 8,360,369.

(Continued)

(51) Int. Cl.
| | |
|---|---|
| *B64C 27/57* | (2006.01) |
| *B64C 27/00* | (2006.01) |
| *B64C 27/04* | (2006.01) |
| *B64C 27/59* | (2006.01) |

(52) U.S. Cl.
CPC ............ *B64C 27/57* (2013.01); *B64C 27/006* (2013.01); *B64C 27/04* (2013.01); *B64C 27/59* (2013.01)

(58) Field of Classification Search
CPC ............ B64C 27/57; B64C 27/56; B64C 27/54
USPC .... 244/197, 196, 194, 17.13, 233, 232, 223; 416/49, 44, 37
See application file for complete search history.

(56) References Cited

U.S. PATENT DOCUMENTS

| | | |
|---|---|---|
| 2,941,605 A | 6/1960 | Sikorsky |
| 2,953,207 A | 9/1960 | Hofmann |

(Continued)

FOREIGN PATENT DOCUMENTS

GB        2192163 A    1/1988

OTHER PUBLICATIONS

*Air Accidents Investigation Branch (AAIB), Robinson R22 Beta, G-BUIW, Nov. 1998, AAIB Bulletin No. 11/98.

*Primary Examiner* — Tien Dinh
*Assistant Examiner* — Richard R Green
(74) *Attorney, Agent, or Firm* — Pritzkau Patent Group, LLC

(57) ABSTRACT

A helicopter includes a rotor system having a rotor with an adjustable pitch that is controlled at least in part by a pilot using a collective control and which helicopter generates a Low RPM signal that is indicative of a threshold low rotational speed of the rotor. An actuator arrangement can move the collective control by exerting a force on the collective control such that the pilot is able to overcome the actuator force but which otherwise can move the collective control from a current operational position toward a minimum pitch position. A clutch can co-rotate with a motor to serve in transferring the actuation force to reduce the adjustable pitch and can slip relative to the actuator shaft assembly responsive to an application of a counterforce applied by the pilot to the collective control such that the counterforce overcomes the actuation force.

18 Claims, 14 Drawing Sheets

Related U.S. Application Data

(60) Provisional application No. 61/264,181, filed on Nov. 24, 2009.

(56) References Cited

U.S. PATENT DOCUMENTS

| | | | |
|---|---|---|---|
| 4,667,909 | A | 5/1987 | Curci |
| 7,223,071 | B2 | 5/2007 | Certain |
| 7,756,612 | B2 | 7/2010 | Salesse-Lavergne |

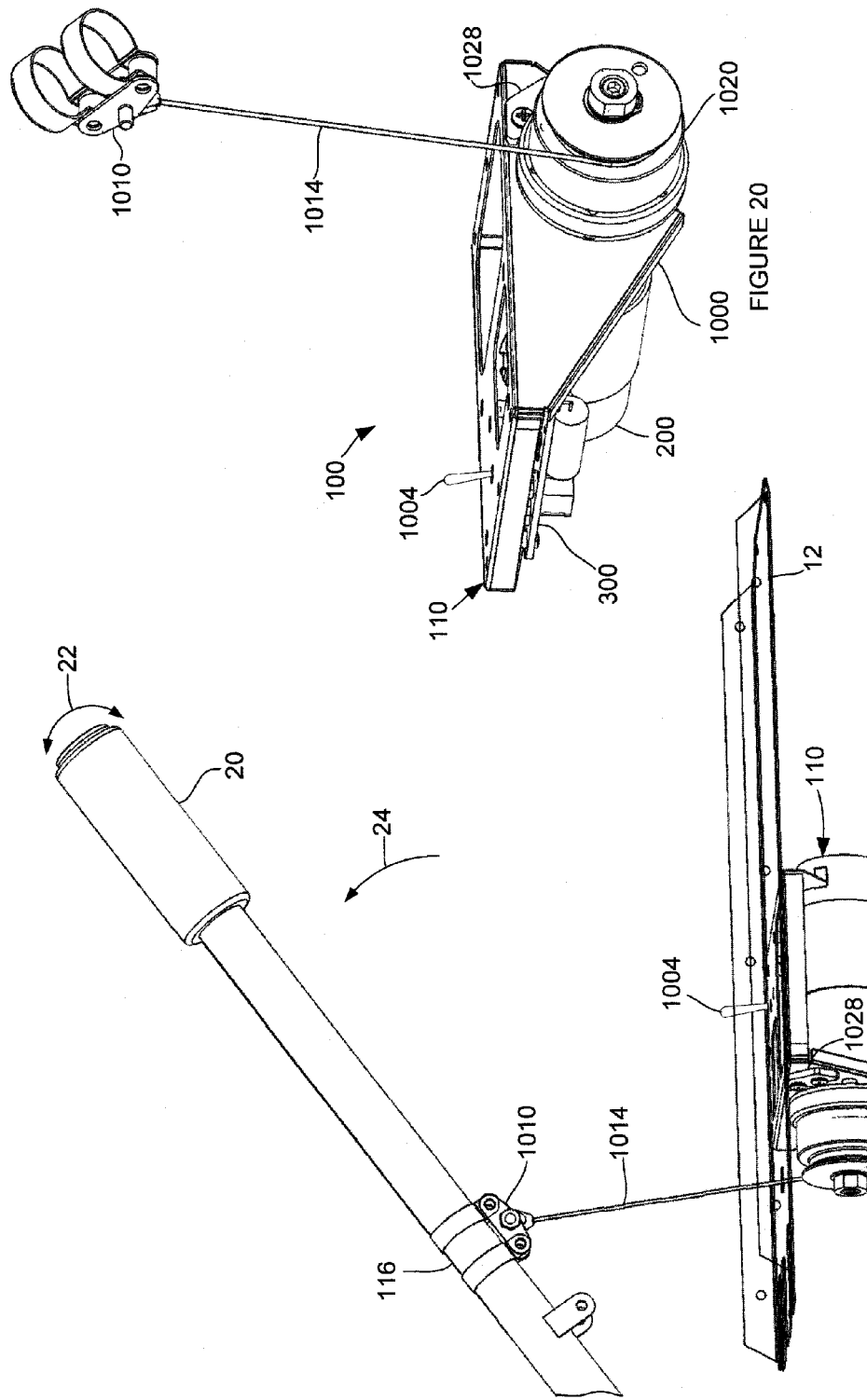

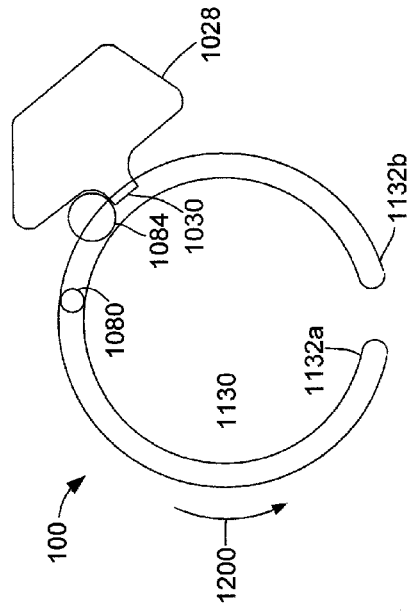
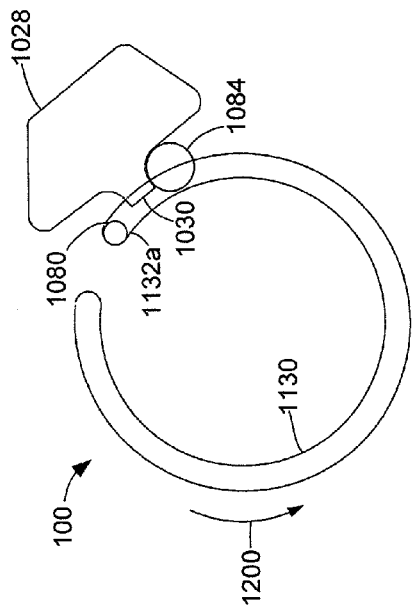
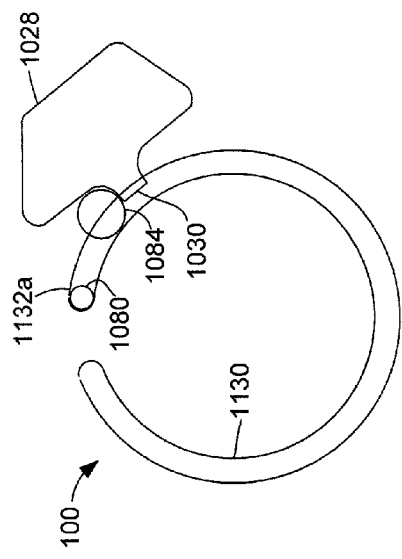
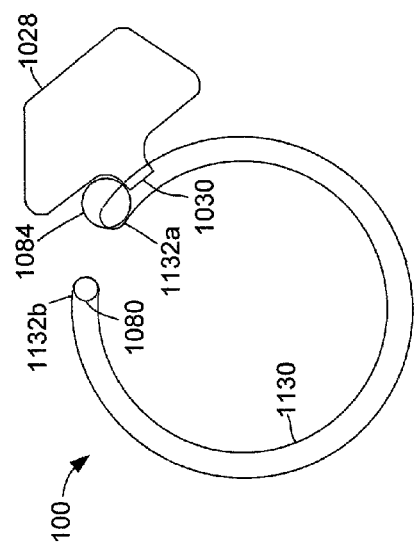

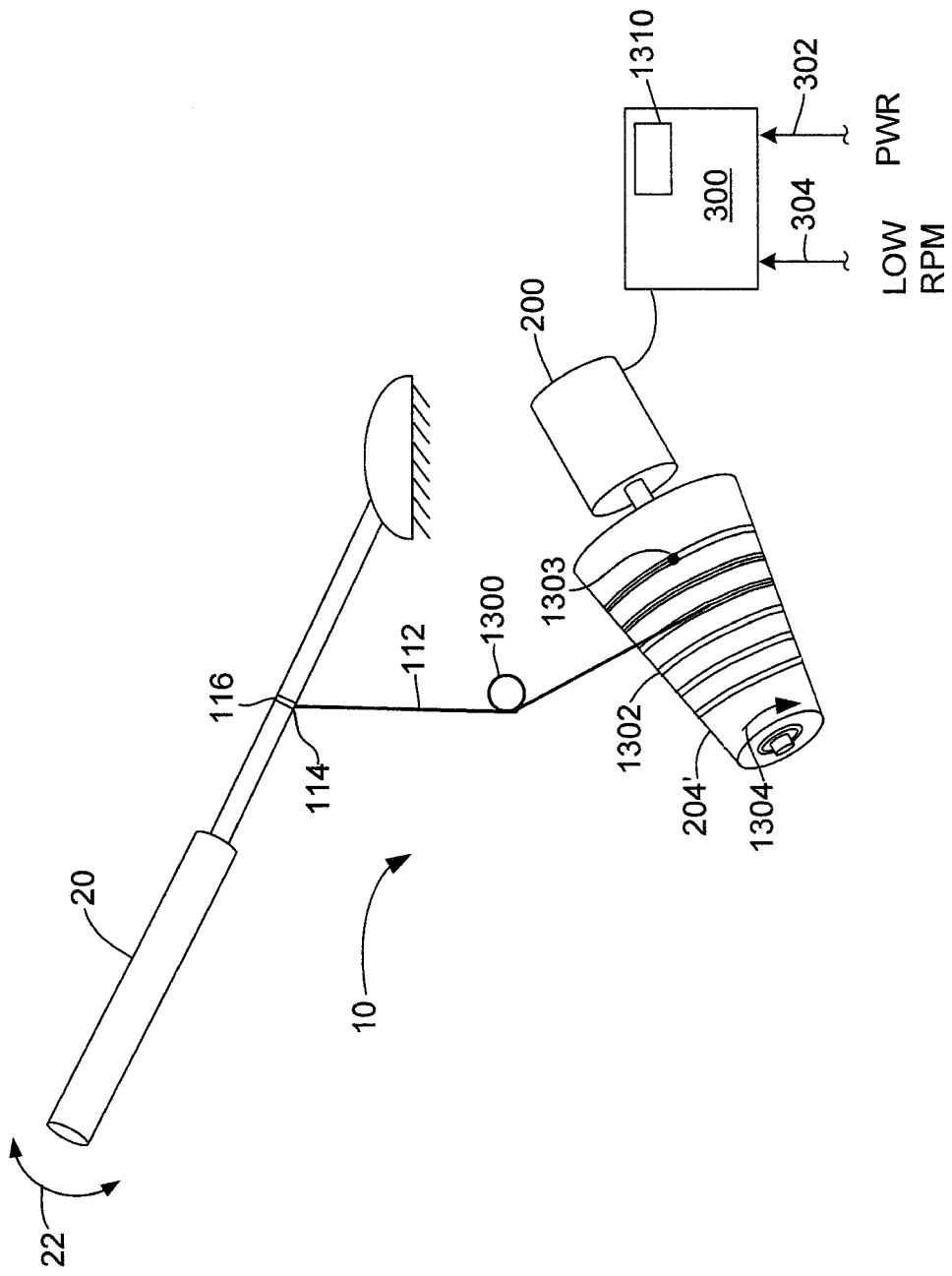

EMERGENCY COLLECTIVE ACTUATOR AND METHOD FOR A HELICOPTER

RELATED APPLICATIONS

The present application is a continuation application of copending U.S. patent application Ser. No. 14/161,877 filed on Jan. 23, 2014, which is a continuation of U.S. patent application Ser. No. 13/479,130 filed on May 23, 2012 and issued as U.S. Pat. No. 8,651,425 on Feb. 18, 2014, which is a continuation-in-part of U.S. patent application Ser. No. 12/953,294 filed on Nov. 23, 2010 and issued as U.S. Pat. No. 8,360,369 on Jan. 29, 2013, which itself claims priority from U.S. Provisional Application Ser. No. 61/264,181 filed on Nov. 24, 2009, each of which applications are hereby incorporated by reference in their entireties.

BACKGROUND

The present invention is related at least generally to helicopter control systems and, more particularly, to an emergency collective actuator and associated method for a helicopter.

It is recognized in the prior art such as is exemplified by U.S. Pat. No. 4,667,909 (hereinafter the '909 patent) that a sudden power failure during the flight of a helicopter requires the immediate attention of the pilot to convert to autorotation by lowering the collective pitch of the main rotor blades of the helicopter. A failure to timely reduce the collective can result in stalling the rotor blades. Such stalling of the rotor blades will generally produce a catastrophic crash wherein the helicopter, quite literally, falls from the sky. One example of such an accident, which likely involved a rotor stall, occurred in the United Kingdom in March of 1998 and is the subject of AAIB Bulletin no. 11/98. Such an accident will generally be fatal to anyone onboard the aircraft. The particular helicopter that was involved in this accident was the Robinson R22, which is a lightweight helicopter having a low-inertia rotor system. It should be appreciated that a low-inertia rotor system can be stalled more easily than a rotor system having a greater level of inertia. The subject accident report outlines operational conditions for the Robinson R22 under which rotor speed will decay to an unrecoverable value in less than 1 second during a climb.

The prevalent teaching in the prior art with regard to avoiding rotor stall appears to be to simply instruct the pilot to lower the collective setting of the rotor immediately in the event of an engine failure to preserve inertia in the rotor system. In practice, Applicants believe that it is questionable how effective this advice might be relative to low rotor inertia helicopters since engine failure appears to be relatively uncommon. Hence, it is difficult for the pilot to immediately react to a situation that has never been fully experienced firsthand. Even during training, Applicants believe that few student pilots are provided with actual experience either in simulation or actual flight that would realistically duplicate an actual engine failure. The lack of such training is attributed to a certain enhanced level of danger that accompanies the training itself, since full down auto-rotation landings require considerable skill in low rotor inertia helicopters and might result in damage to the helicopter. In this regard, flight instructors are advised to warn a student pilot prior to initiating training exercises relating to power failure simulation, at least in the Robinson R22.

The '909 patent appears to be consistent with the prior art in recommending that the pilot should react immediately and seeks to alleviate the problem by relocating the collective control. Applicants believe that this approach is of limited value since the collective control is traditionally located by the pilot's left hand. It is believed that most experienced pilots would object to relocating this critically important control, since reaction time could at least arguably be increased simply by moving the collective control to a non-traditional location.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, an apparatus and method are described for use with a helicopter including a rotor system having a rotor with an adjustable pitch that is controlled at least in part by a pilot using a collective control and which helicopter generates a Low RPM signal that is indicative of a threshold low rotational speed of the rotor. In one aspect, an actuator arrangement is configured for moving the collective control by exerting a force on the collective control such that the pilot is able to overcome the force but which otherwise moves the collective control from a current operational position toward a minimum pitch position. A control arrangement is configured for receiving the Low RPM signal and for responding to the Low RPM signal by activating the actuator arrangement for at least a predetermined period of time to apply the force to move the collective control from the current operational position to the minimum pitch position in an absence of a collective control input from the pilot. In one feature, the control arrangement is further configured for entering a lockout interval immediately following the predetermined period of time, during which lockout interval the Low RPM signal is disabled from activating the actuator arrangement.

In another aspect, the Low RPM signal is received and responded to by exerting a force to move the collective control from the current operational position to the minimum pitch position for a predetermined period of time in an absence of a collective control input from the pilot such that the pilot is able to overcome the force but which otherwise moves the collective control from a current operational position toward a minimum pitch position. In one feature, a lockout interval is entered immediately following the predetermined period of time during which lockout interval the Low RPM signal is disabled from causing the collective to move.

In still another aspect, an apparatus and associated method are described for use with a helicopter including a rotor system having a main rotor with an adjustable pitch that is controlled at least in part by a pilot using a collective control. The apparatus includes an actuator arrangement that is configured to change the adjustable pitch by exerting an actuation force such that the pilot is able to overcome the actuation force using the collective control but which otherwise biases the adjustable pitch into a minimum collective pitch position. A control arrangement is configured to receive a signal that is indicative of a low rotor RPM condition and to respond to the signal by activating the actuator arrangement to exert the actuation force.

In an embodiment, a motor includes a motor shaft and the motor shaft supports an actuator shaft assembly which includes a clutch disk that co-rotates with the motor shaft. A clutch assembly can be supported by the clutch disk and can be configured to co-rotate with the actuator shaft assembly in the given direction to serve in transferring the actuation force to reduce the adjustable pitch and to slip relative to the actuator shaft assembly responsive to an application of a counterforce applied by the pilot to the collective control such that the counterforce overcomes the actuation force to thereby at least maintain a current setting of the adjustable pitch.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

FIG. 19 is another installed diagrammatic perspective view of the embodiment of the emergency collective actuator of FIG. 17, but shown here with the collective control of the helicopter in a fully raised position.

FIG. 20 is a diagrammatic perspective view of the embodiment of the emergency collective actuator of FIG. 19 shown in a further enlarged view in isolation from the helicopter, but corresponding to the fully raised position of the collective.

FIGS. 24*a*-24*d* are diagrammatic end views that illustrate the relationship between various components of the emergency collective actuator embodiment of FIGS. 19-23 in various operational states that are of interest.

FIG. 25 is a diagrammatic view, in partial perspective, of another embodiment of the emergency collective actuator of the present disclosure.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology such as, for example, upper/lower, uppermost/lowermost, vertically/horizontally and the like may be adopted for purposes of enhancing the reader's understanding, with respect to the various views provided in the figures, and is in no way intended as being limiting.

Figure 1:
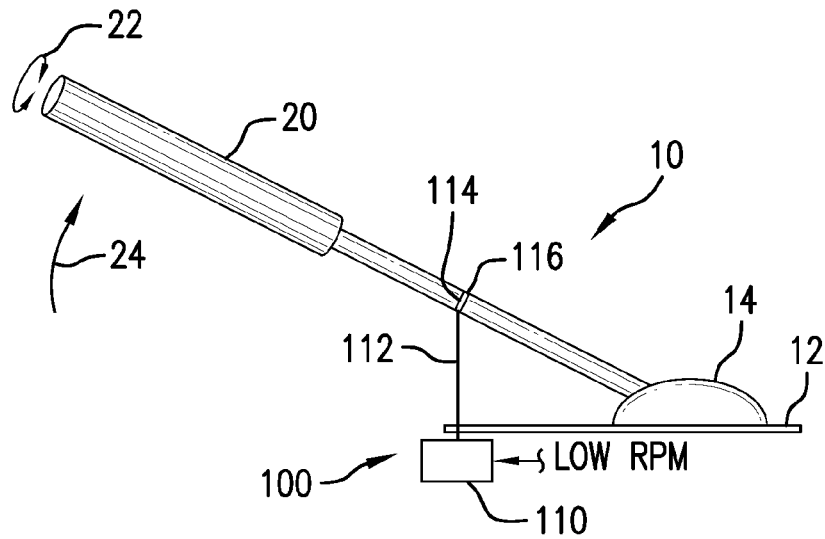
FIG. 1 is a diagrammatic view, in elevation, of a helicopter collective control coupled with an emergency collective actuator of the present disclosure.

Attention is now directed to the figures wherein like reference numbers may refer to like items throughout the various views. FIG. 1 is a diagrammatic view, in elevation, of a helicopter collective control that is generally indicated by the reference number 10 and which is representative of the collective control in a helicopter such as, for example, the Robinson R22. Collective control 10 is positioned on a panel 12 of the helicopter and is attached to a pivot 14 at one end. A handle end 20 of the collective control is configured for gripping by a pilot and includes a throttle control that is actuatable by twisting handle 20 as indicated by a double headed arrow 22. The pilot can increase the collective by moving handle 20 pivotally in the direction indicated by an arrow 24 or reduce collective by moving handle 20 oppositely.

Still referring to FIG. 1, an emergency collective actuator arrangement is generally indicated by the reference number 100. The emergency collective actuator arrangement includes a main unit 110 that is configured to receive a Low RPM signal that is generated by the helicopter. In the instance of the Robinson R22, the Low RPM signal is produced when the rotor speed falls to 97% of normal or less. Normally, the Low RPM signal is used to actuate a warning horn and light to draw the pilot's attention to the status of the rotor speed. The manner in which main unit 110 uses the Low RPM signal will become evident in the discussions which follow.

A control cable 112 extends from main unit 110 to a clamp arrangement 114 that is attached to an intermediate position 116 on collective control 10. Any suitable control cable and clamp arrangement can be used so long as the attachment is reliable. The clamp arrangement should be located sufficiently away from the pivot end and the handle end of the collective control so as to avoid any interference with normal operation or with actuation by the pilot. In response to the Low RPM signal, main unit 110 retracts cable 112 so as to lower the collective. This operation proceeds automatically in response to reception of the Low RPM signal and can be initiated essentially instantaneously, at least from a practical standpoint, e.g. in 0.001 seconds (1 ms) or less in response to the Low RPM signal, but in any event significantly less than the reaction time of even an attentive pilot. In one embodiment, the reaction time of main unit 110 can be adjustable, and yet remain far less than the typical reaction time of the pilot to provide a significant safety enhancement. Typically, however, the circuitry will be allowed to react as quickly as it is capable of reacting without introducing any additional delay. In this regard, under certain flight conditions outlined in the AAIB accident report that is discussed in the Background Section, Applicants believe that the required reaction time may be so short as to present a virtually unrecoverable condition in the absence of the use of emergency collective control 110 and its associated method. As will be described in further detail, the retraction force that is applied to collective control 20 by emergency collective actuator 100 can be overcome by the pilot, although the force is sufficient to inform the pilot that the unit is attempting to lower the collective when the left hand of the pilot is holding collective handle 20. In this regard, the collective control may have a friction setting that can be engaged by the pilot to introduce additional friction at pivot 14 so that the pilot is able to at least momentarily release his or her hand from the collective. The retraction force is therefore configured such that the collective can be lowered by the emergency collective control unit even if the highest setting of the friction control is in use.

Figure 2:
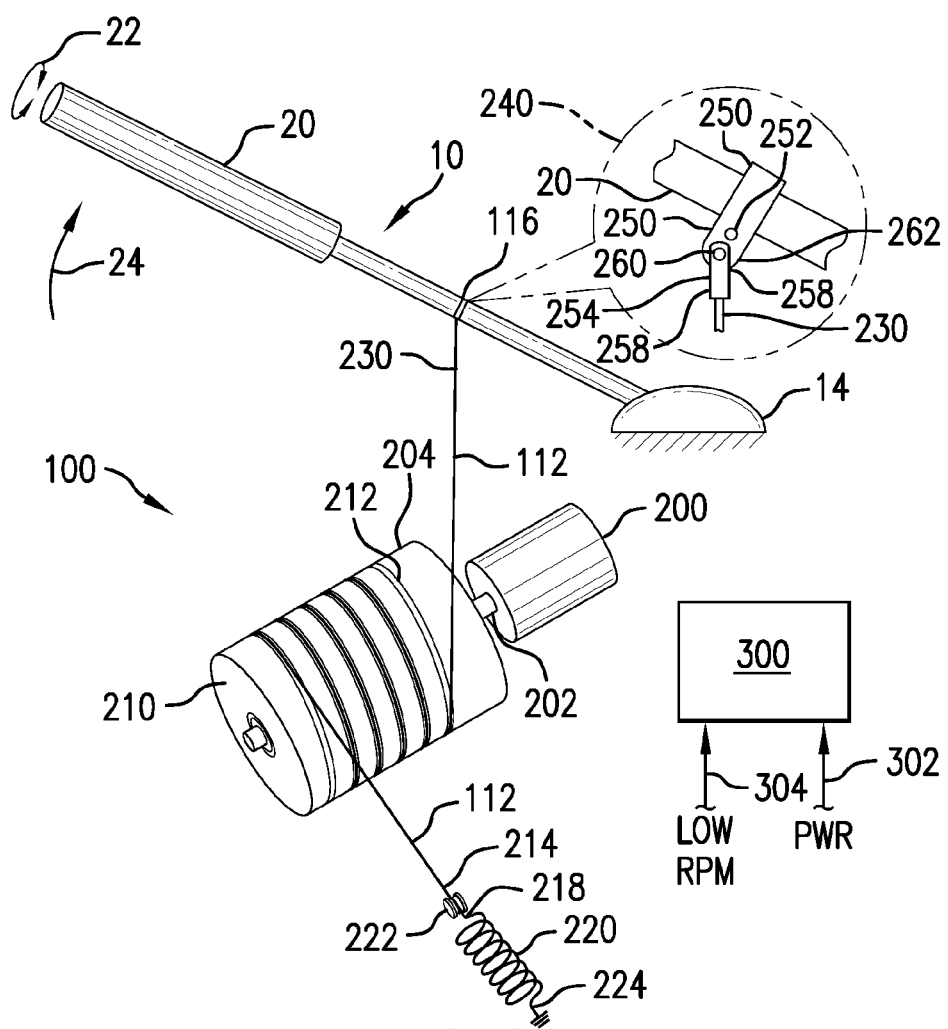
FIG. 2 is a diagrammatic view, in elevation and partially in perspective, showing one embodiment of an emergency collective control.

Referring now to FIG. 2, a diagrammatic illustration, partially in a perspective view and partially in an elevational view is provided showing one embodiment of emergency collective control 100. In this embodiment, as part of main unit 110, a motor 200 includes an output shaft 202 that rotates a drum 204. The latter can be received directly on output shaft 202, for example, at each one of a pair of opposing end walls 210, only one of which is visible. Drum 204 defines a spiral groove 212 that can include one or more turns around the periphery of the drum. Groove 212 can have a suitable profile in cross-section such as, for example, a V-shape or a U-shape. Cable 112 can be received around the drum to form at least one turn therearound. The drum may be formed from any suitable material such as, for example, a lightweight aluminum alloy. One end 214 of cable 112 extends to and is attached to a first end 218 of a spring 220. In the present embodiment, the spring is a helical coil spring, although any suitable type of spring may be used so long as the spring is able to maintain some degree of tension on the cable irrespective of the position of collective control 20. In this regard, the spring serves to maintain tension and accommodate movement of the collective without providing any noticeable resistance to actuations by the pilot.

Cable 112 may be attached to the spring in any suitable manner such as, for example, by using a crimping clamp 222. An opposing end 224 of the spring is suitably fixedly attached to a convenient location on the helicopter such as, for example, the bottom of panel 12 (shown diagrammatically) such that resilient tension is continuously applied to cable 112. An opposing end 230 of cable 112 extends for attachment to intermediate position 116 of collective control 20. One arrangement for attaching cable 112 to the collective control is shown in an enlarged view within a dashed circle 240. A clamping ring 250, typically a metal band, is shaped to fit around the periphery of the collective control and is tightened about the periphery using a suitable fastener 252 such as, for example, a rivet. A cable end fitting 254 can be attached to end 230 of the cable, for example, by crimping/ compressing and can have a bifurcated shape with two opposing tines 258 (only one of which is visible), each of which defines an opening 260. A pin, which is not shown due to illustrative constraints, is receivable in openings 260 and through ears 262 of clamping ring 250 such that end fitting 254 can pivot about the pin.

In this embodiment, motor 200 is configured to rotate with the drum in the event that the pilot pulls the collective upward to overcome the retraction force that is provided from motor 200. The number of turns of cable 112 around the drum in spiral groove 212 should provide sufficient frictional engagement between the drum and cable so as to avoid slipping of the cable relative to the drum in view of tension that is provided by spring 220. An electronic control section forms another part of main unit 110 and is used to provide electrical drive to motor 200 with power being provided from the helicopter on a line 302 and Low RPM signal being provided on a line 304, as will be further described immediately hereinafter.

Figure 3:
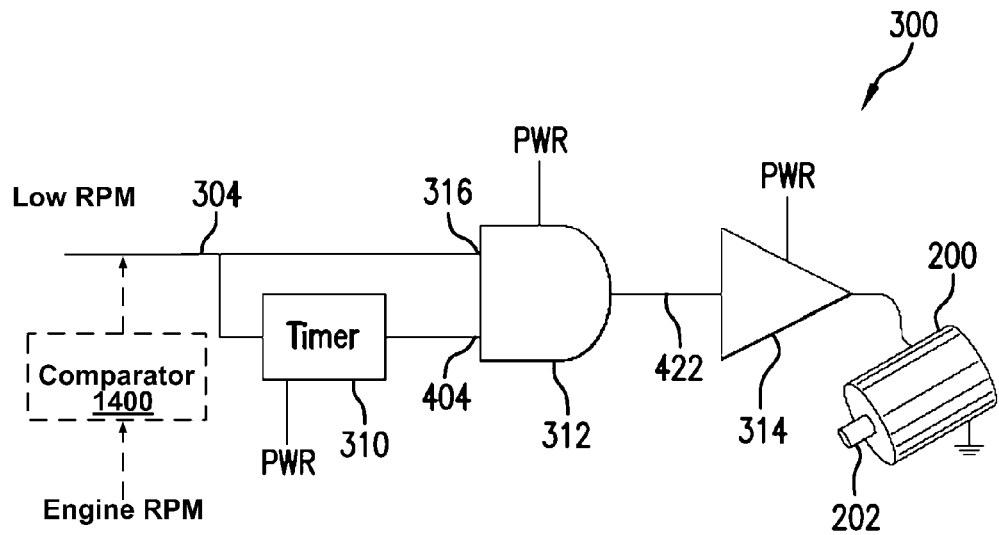
FIG. 3 is a block diagram showing one embodiment of a control section which can form part of the emergency collective control.

Turning to FIG. 3, electronic control section 300 is shown in block diagram form. As noted above, operational power is received from the helicopter on line 302 (shown in FIG. 2) and the Low RPM signal is received on line 304. Power is provided to each of a timer 310, an AND gate 312 and a driver 314. It is to be understood that a power supply section can be provided in the event that these components have varying power requirements with respect to one another and/or with respect to the power that is available directly from the helicopter. For purposes of descriptive convenience, it will be assumed that control section 300 employs active-high logic, although active-low logic can just as readily be used. Initially, the Low RPM signal is provided as a logic high signal to one input 316 of AND gate 312 and to timer 310. It is considered that one having ordinary skill in the art may readily implement appropriate circuitry in a wide variety of forms with this overall disclosure in hand.

Figure 4:
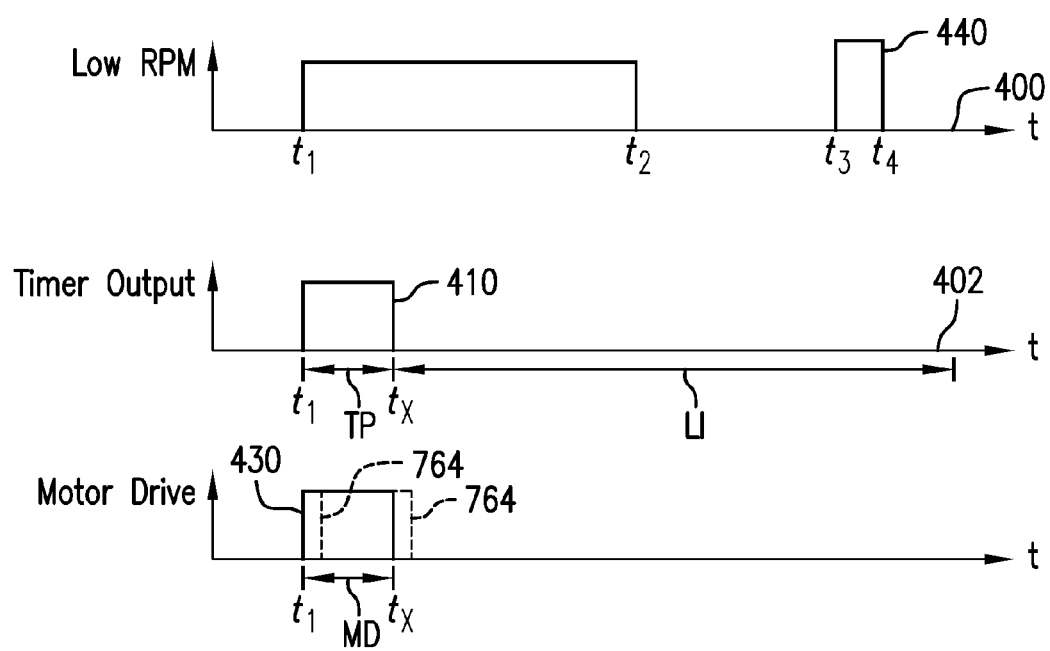
FIG. 4 is a timing diagram which illustrates timer output control signals and a motor drive signal produced by the control section.

Having described FIGS. 1-3 in detail above, attention will now be directed to operational details of one embodiment of emergency collective actuator 100 with additional reference to the timing diagram of FIG. 4. This timing diagram illustrates the Low RPM signal in a plot 400 showing the signal versus time. At a time $t_1$, the Low RPM signal transitions to a high, alert status at which time the helicopter horn would sound and the Low RPM indicator light illuminates. It should be appreciated that various conditions may be encountered during a given autorotation based, at least in part, on the pilot's choice of a suitable landing site. For example, in order to achieve maximum range in the Robinson R22, a forward speed of 70 knots is recommended with 90% of normal rotor rotational rate. Of course, under these conditions, the Low RPM horn will sound continuously. Under other conditions, however, the pilot may achieve more than 97% of normal rotor rotational rate after the initial sounding of the Low RPM horn such the horn is at least temporarily extinguished. One example of an event that would extinguish the Low RPM signal would be for the pilot to initiate autorotation with aft cyclic which causes the main rotor speed to rise above 97% of normal. Another example of an event that may result in a change in the status of the Low RPM signal resides in what is typically referred to as a "flare" that is used to slow the speed of the helicopter during autorotation immediately prior to landing. During this flare, main rotor speed increases and then decreases as the pilot adds collective just before landing. Accordingly, it should be appreciated that the Low RPM signal may toggle between active and inactive conditions during autorotation depending on the changing rotational status of the helicopter main rotor. In the present example, which is not intended as being limiting, the initial low RPM event ends at a time $t_2$. Subsequently, at $t_3$, the Low RPM signal again becomes active until $t_4$.

Timer 310 of FIG. 3 may operate according to a timer output plot 402 of FIG. 4 which is provided to one input 404 of AND gate 312. In response to the Low RPM signal, timer 310 produces a timer pulse 410 that is present at input 404 of AND gate 312. The timer pulse is indicated as having an overall duration of TP extending from time $t_1$ to $t_x$. The initiation of the timer pulse interval can take place, for example within 1 millisecond of the Low RPM signal based on any time delay introduced by timer 310. From a practical standpoint, and in terms of human perception, timer output 402 can become active at $t_1$. A motor drive signal 420 is generated at an output 422 of AND gate 312. So long as both inputs of AND gate 312 are active/high, output 422 of the AND gate will also be active/high. If either one of the inputs of the AND gate is low, however, its output will likewise be low. In the present example, Low RPM signal 400 and timer output 402 are both active for the duration TP of timer pulse 410 such that motor drive signal 420 includes a motor drive pulse 430 that is of a duration MD which corresponds to duration TP of the timer pulse, at least from a practical standpoint, although a time delay may be introduced by the circuitry that is imperceptible by human observation. The duration of timer pulse TP can be customized based on a particular helicopter application, however, TP should be long enough to allow for a relatively slow reaction time on the part of the pilot. In this regard, Applicants note that it is often desirable to accommodate potential reaction times of several seconds on the part of the pilot. For this reason, the predetermined interval of timer pulse, TP, and therefore MD may be of six seconds or longer duration, although this is not a requirement; the predetermined interval may be any length, including a length with no end-point. For purposes of driving motor 200, motor drive signal 420 is provided to driver 314 which provides current to the motor if the electrical current requirements of the motor cannot be satisfied directly by AND gate 312.

Continuing with a description of the operation of emergency collective actuator 100, it should be appreciated that a pulse 440 which is present from $t_3$ to $t_4$ of Low RPM signal 400, in the present example, is not reflected by motor drive signal 420 for the reason that pulse 440 occurs well after $t_x$ which terminates timer pulse TP. In this regard, after issuing a timer pulse, timer 310 is configured to enter a Lockout Interval LI during which time the timer output is low such that any active signal events that might occur on the Low RPM signal cannot influence motor drive signal 420. The Lockout Interval can be of a duration that is sufficient to ensure enough time for a full auto rotation to the ground such as, for example, 5 minutes or longer. In this way, emergency collective actuator 100 reacts to an initial low RPM event immediately and advantageously need not counter any subsequent actuation of the collective control by the pilot which is required during autorotation, for example, such as may occur during the flare, as discussed above. Overall circuitry delays can be managed to a degree that causes the collective to actuate immediately in terms of human perception responsive to the Low RPM signal, for example, the overall delay to start motor rotation may be 1 millisecond or less, although longer delays are also acceptable and still faster than the reaction time of a typical pilot. It should be appreciated, however, that the pilot can counter any actuations by the emergency collective control at any time if he or she so chooses, even during motor drive interval MD. In this regard, for purposes of low-level hovering and maneuvers, the pilot will have his or her hand on the collective. At such sufficiently low altitude, pilots are trained to increase the collective since it is not practical to try to increase the amount of energy stored in the rotor system using autorotation. In the event that the pilot feels an actuation that is attempting to lower the collective at such low altitude, the pilot can be trained to resist the actuation and increase the collective.

Figure 5:
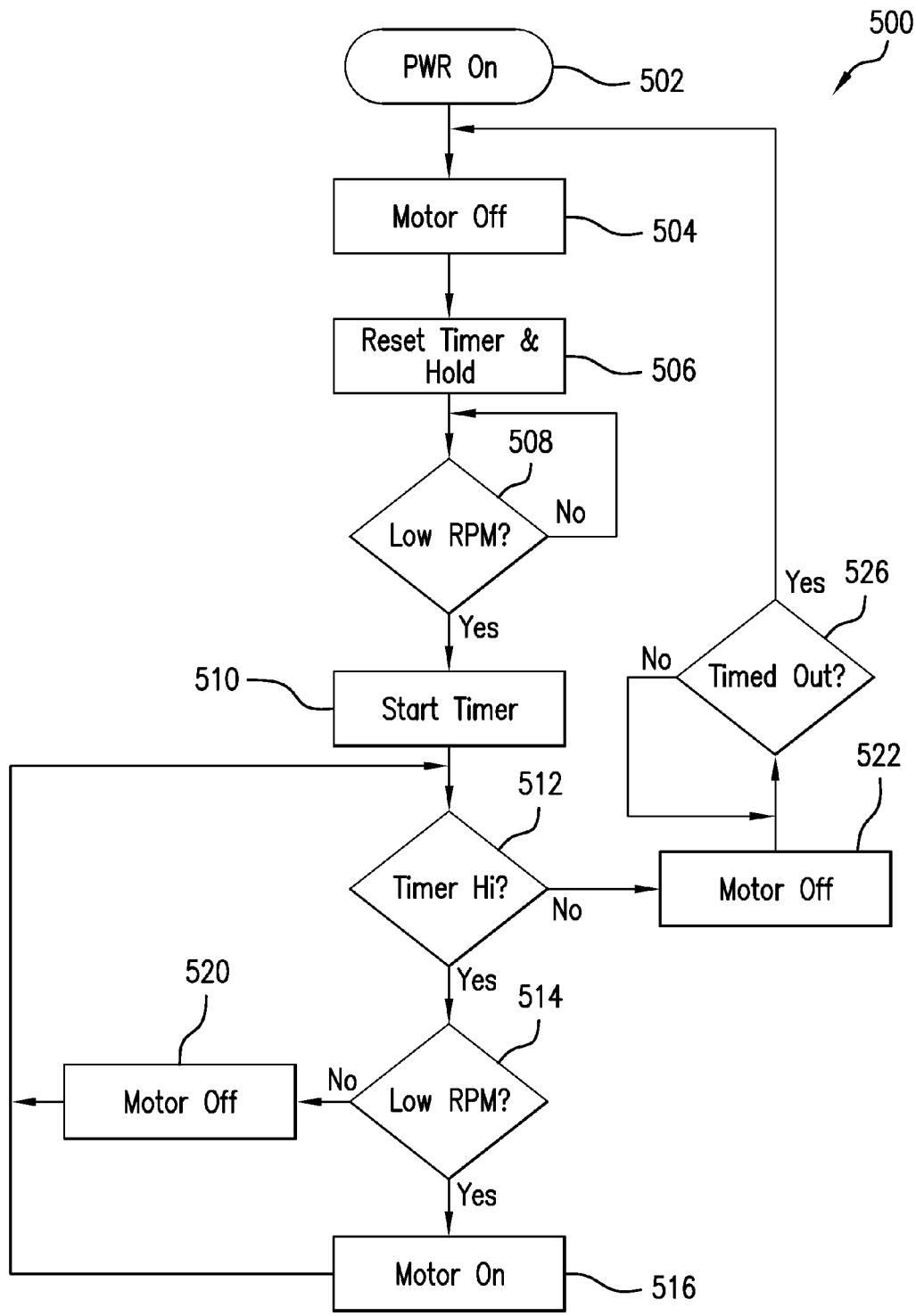
FIG. 5 illustrates one embodiment of a method for operating the emergency collective actuator of the present disclosure.

Turning now to FIGS. 3 through 5, the latter illustrates one embodiment of a method for the operation of the emergency collective actuator, generally indicated by the reference number 500. The method starts at 502 when the emergency collective actuator system is powered up. At 504, motor 200 is maintained in an OFF status. At 506, timer 310 (FIG. 3) is reset to zero and held ready for triggering. Step 508 then monitors the Low RPM signal and executes in a continuous loop so long as the Low RPM signal is low/inactive. When the Low RPM signal becomes high/active, step 510 starts timer 310 (at time $t_1$ of timer waveform 402 in FIG. 4). The timer output remains high/active until $t_x$, as shown in waveform 402 which can be, for example, six seconds as described above. Step 512 checks the timer signal following $t_1$. If the timer output is high/active, execution enters step 514 which reconfirms that the Low RPM signal is active/high. If the Low RPM signal is high, step 516 turns on motor 200 or maintains the motor in an ON status so as to retract the collective. Operation then returns to step 512. If at step 514, the Low RPM signal is determined to be inactive, step 520 turns motor 200 off and execution returns to step 512. When step 512 determines that the timer output is low, subsequent to $t_x$ in timer plot 402, step 522 turns motor 200 off. Operation then proceeds to step 526 which monitors timer output 402 for the expiration of the Lockout Interval, shown as LI in timer output plot 402. One suitable value for the Lockout Interval is 5 minutes, as described above. Following the Lockout Interval, operation returns to step 504.

Figure 6:
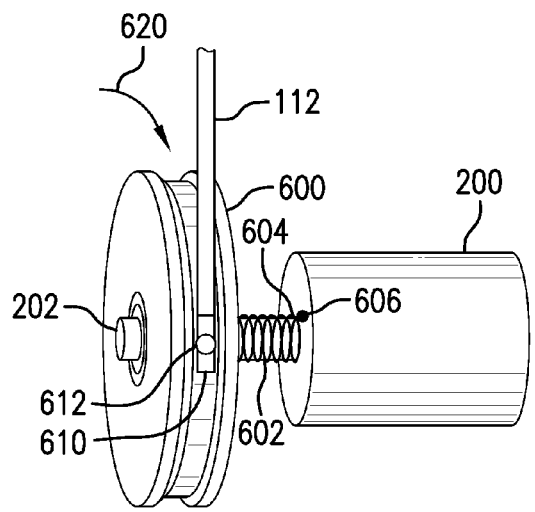
FIGS. 6-9 are diagrammatic views, in elevation, showing details with respect to another embodiment of actuation components of the emergency collective actuator.

Turning now to FIG. 6, another embodiment is illustrated, in a diagrammatic perspective view, showing motor 200 which rotates a pulley 600. One suitable motor has been found to be the MFA 942D series geared motor that is available from Como Drills of the United Kingdom. It is noted that this motor is suitable for all of the embodiments described herein at least for the reason that the application of external torque to the output shaft can freely rotate the gear assembly of the motor and the motor itself. Other geared and non-geared motors, however, may also be found to be suitable. The pulley may be configured in any suitable manner such as, for example, defining a groove for receiving cable 112, as illustrated. The pulley is mounted on motor shaft 202 to extend through a helical coil spring 602. One end 604 of the helical coil spring is fixedly attached, for example, to motor 200 or other suitable structure such as a bracket (not shown) that supports the motor. It should be appreciated that any suitable form of spring may be used. For example, a planar clock-spring may be used employing a spiral winding. The attachment of end 604 may be performed in any suitable manner, for example by using a fastener 606. An opposing end of the spring, which is not visible in the present view, is attached to pulley 600 in any suitable manner such as, for example, by using a fastener. Cable 212 can be attached to pulley 600, for example, using a swaged fitting 610 at the end of the cable which receives a suitable fastener 612 that is fixedly received in the periphery of the pulley. It is noted that the illustrated position of pulley 600 corresponds to the full up position of collective control 10 (FIG. 1). At this position, spring 602 is pre-tensioned so as to apply a force in a direction 620, indicated by an arrow, such that the pulley takes up slack in cable 112 if the pilot lowers the collective. In this regard, spring 602 applies sufficient force to rotate the motor output shaft in taking up the slack in the cable. Pulley 600 is configured with a diameter such that less than one rotation of the pulley takes place from a full up position to a fully lowered position of the collective control so that there is no need for cable 112 to overlap on itself. In response to the Low RPM signal, motor 200 rotates pulley 600 in the direction of arrow 620 so as to lower the collective in accordance with the descriptions above. Motor 200 should have sufficient torque to apply additional tension to spring 604 as the motor lowers the collective. Since less than one turn of the pulley is needed, the added torque that is needed to further wind the spring is readily manageable. In another embodiment, motor 200 may be supplied with a relatively small current which causes the motor to rotate pulley 600 in the direction of arrow 610 so as to take up any slack in cable 112 but without applying enough torque to lower the collective during normal flight conditions. In this later embodiment, spring 602 is not needed.

Figure 7:
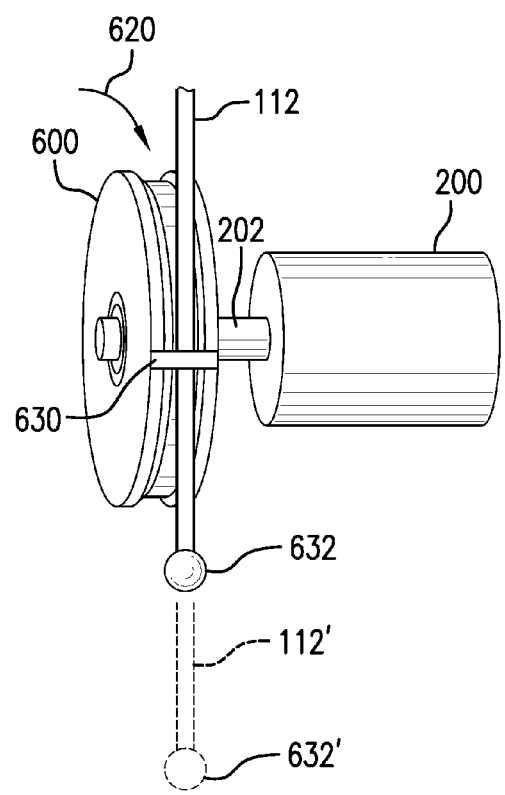

FIG. 7 is a diagrammatic perspective view of another embodiment in which cable 112 extends through the pulley groove beyond a capture band 630 that is fixedly attached to the pulley periphery in any suitable manner such as, for example, by welding. Capture band 630 may be formed in any suitable configuration so long as cable 112 is able to freely move vertically in the pulley groove. In instances where the cable diameter is greater than the width of the pulley groove, capture band 630 may be in a loop configuration so as to extend outward from the periphery of the pulley. A distal end of cable 112 supports an endpiece 632 that can be attached to the cable end in any suitable manner such as, for example, by swaging. The illustrated position of the pulley and capture band corresponds to a home or idle position under normal flight conditions such that cable 112 can move freely in the vertical direction responsive to actuations of the collective by the pilot. The weight of endpiece 632 can serve to prevent binding of cable 112 between capture band 630 and the pulley and generally maintain the orientation of the cable. As shown, cable 112 and endpiece 632 represent the fully raised position of the collective. The cable and endpiece are shown in phantom at the fully lowered position of the collective as indicated by the reference numbers 112' and 632', respectively.

Figure 8:
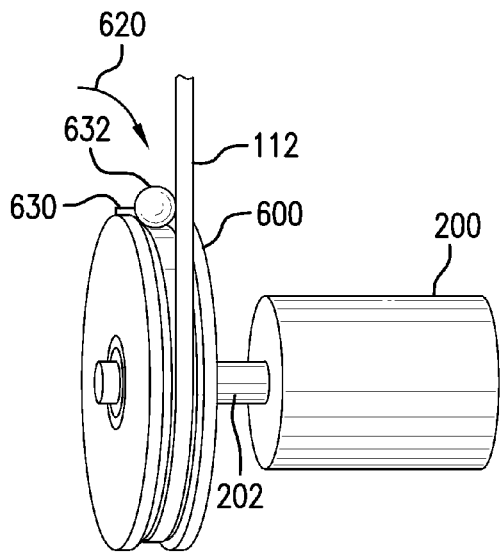

Referring to FIG. 8 in conjunction with FIG. 7, motor 200 rotates pulley 600 in the direction of arrow 620 responsive to the Low RPM signal. At some point in the rotation of pulley 600, endpiece 632 encounters capture band 630. Since the endpiece is sized so as to be unable to pass between capture band 630 and the pulley, cable 112 is retracted onto the pulley and the collective is lowered in a manner that is consistent with the descriptions above. FIG. 8 illustrates the arrangement of the components at the fully retracted or lowered position of the collective. The pilot may counteract the operation of motor 200 during the retraction period or following the retraction period by applying upward force to the collective which will counter-rotate the motor and pulley.

Figure 9:
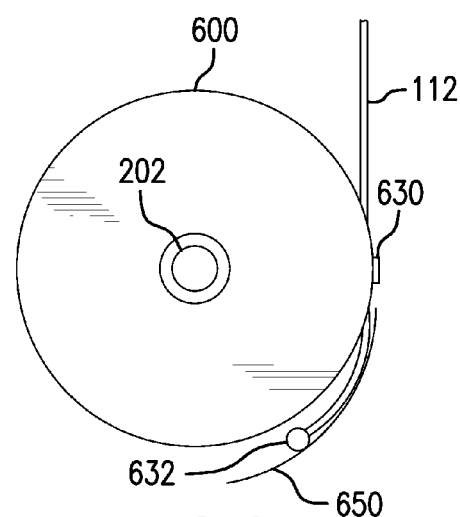

FIG. 9 is a diagrammatic end view, in elevation, of the embodiment of FIGS. 7 and 8, further including a shield 650 that is arranged to deflect cable 112 and endpiece 632 such that interference with components of the helicopter below the emergency collective actuator can be avoided, if such interference is a possibility. Shield 650 may be formed from any suitable material such as, for example, metal and in any suitable shape such as, for example, a trough shape. The shield may be supported in any suitable manner such as, for example, by using a bracket that is attached to the helicopter.

Figure 10:
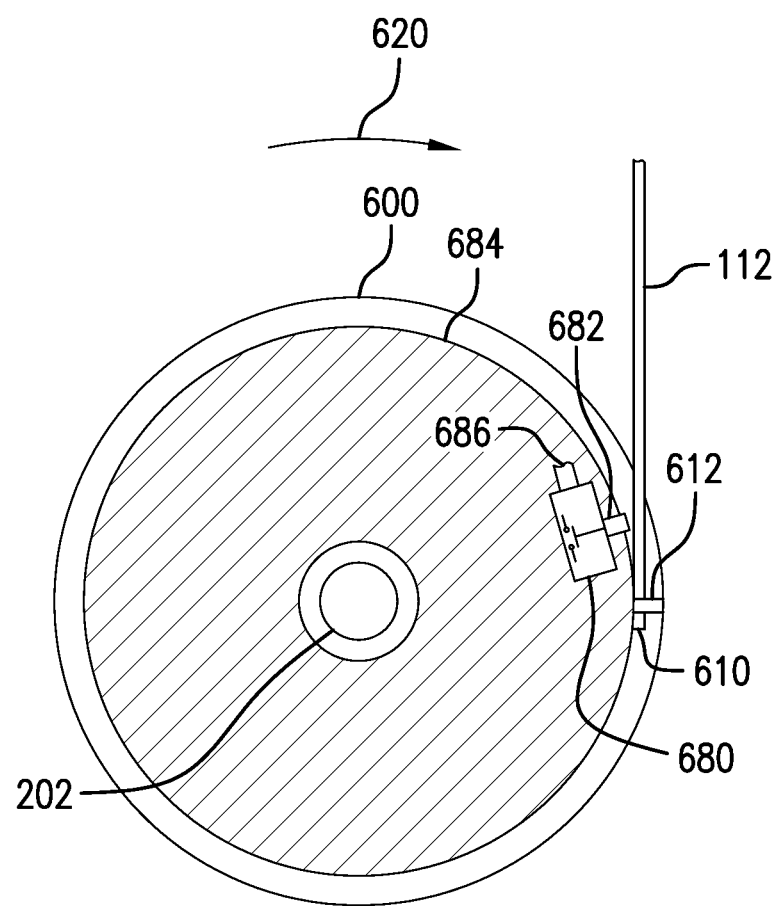
FIG. 10 is a diagrammatic, partially cut-away end view of another embodiment of actuation components of the emergency collective actuator.

Attention is now directed to FIG. 10 which is a diagrammatic partially cut-away end view of another embodiment which resembles the embodiment of FIG. 6 with an exception that helical coil spring 602 is not used. Further, pulley 600 is shown as being partially cut-away to illustrate the presence of a micro-switch 680. The micro-switch can be of the normally open type, although this is not a requirement, and includes an actuator 682 that extends through floor 684 of the pulley groove such that an open condition of the switch indicates that there is slack in cable 112. On the other hand, when tension is applied to cable 112, pulley 600 rotates and applies tension to the cable such that the cable causes the micro-switch to close. Indications of the status of the micro-switch can be provided on a pair of electrical leads 686, for example, to control unit 300 (FIG. 2). Based on the status of the micro-switch, control unit 300 can monitor the switch to ensure that there is no slack in cable 112. Since the pulley rotates less than one turn in its travel, the use of simple electrical connections is facilitated such as, for example, a flexible wiring harness. Pulley 600 may be machined to support micro-switch 680. The location of the micro-switch may be maintained in any suitable manner in the pulley, for example, using an adhesive and/or one or more suitable fasteners.

Figure 11:
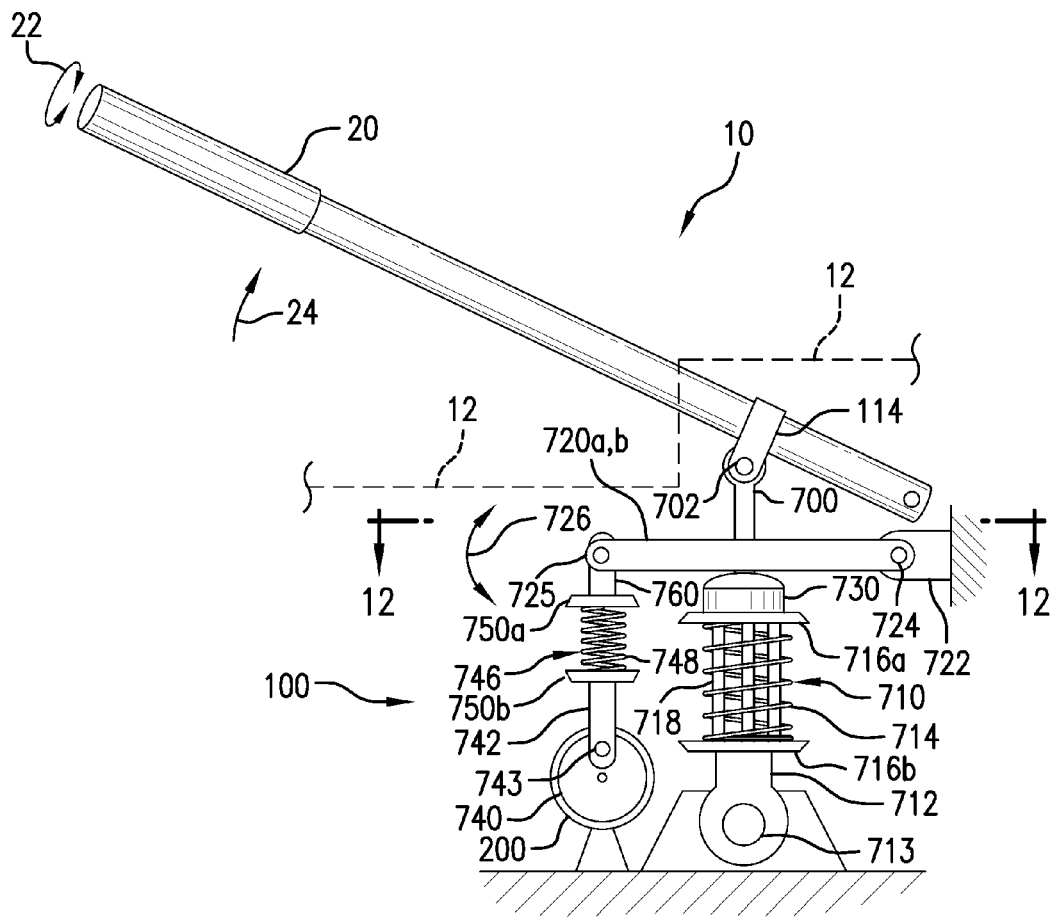
FIG. 11 is a diagrammatic view, in elevation, showing another embodiment of the emergency collective actuator showing the collective control in a raised position.

Turning now to FIG. 11, another embodiment of emergency collective actuator arrangement 100 is diagrammatically illustrated. In this embodiment, the actuator arrangement can be concealed below floorboard or deck 12 of the helicopter. In this regard, it should be appreciated that the deck can have a complex shape. Clamp 114 is pivotally connected to an upper counterbalance arm 700 via a pin 702. A counterbalance spring arrangement 710 can be connected at an upper end to upper counterbalance arm 700. A lower counterbalance arm 712 can be connected at one end to a lower end of spring arrangement 710 and pivotally connected to a suitable fixed location on the helicopter at a lower end via a pin 713. A helical coil spring 714 can be captured between upper and lower disks 716*a* and 716*b* using three shafts 718 (one of which is indicated). It is noted that the upper and lower counterbalance arms as well as the counterbalance spring arrangement may be provided as original equipment in a particular helicopter. In view of the present example, however, it is considered that one having ordinary skill in the art can readily implement an installation for a helicopter that is equipped with a different collective control configuration.

Figure 12:
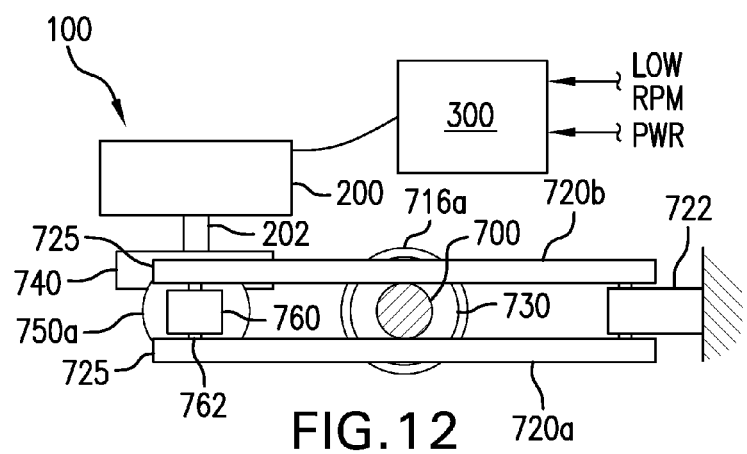
FIG. 12 is a diagrammatic plan view, in partial cross-section, showing further details of the embodiment of the emergency collective actuator of FIG. 11.

Referring to FIG. 12, in conjunction with FIG. 11, the former is a diagrammatic view, in partial cross-section, taken from a line 12-12 that is shown in FIG. 11, and shown here to illustrate further details with respect to the components of emergency collective control arrangement 100. First and second lever arms 720*a* and 720*b* are pivotally connected at a first end to a suitable fixed position in the helicopter, for example, using a bracket 722 and pivot pin 724 such that second ends 725 of the lever arms can rotate as indicated by a double headed arrow 726. The lever arms are disposed at either side of upper counter balance arm 700 and can pivot against a crown member 730 that includes an arcuate head which defines an aperture for receiving the shaft of the upper counter balance arm. Output shaft 202 of motor 200 supports a disk 740 for selective rotation responsive to control section 300. A lower actuator arm 742 is pivotally connected to disk 740 having a pivot point 743 off-center with respect to the motor shaft. An upper end of lower actuator arm 742 is connected to an actuator spring arrangement 746. In the present example, the actuator spring arrangement includes a helical coil spring 748 having caps 750*a* and 750*b* mounted on its opposing ends with cap 750*b*, in turn, attached to an upper end of the lower actuator arm. It should be appreciated that any suitable type of spring arrangement can be used. An upper actuator arm 760 can be pivotally received between lever arms 720*a* and 720*b* at their second ends 725, for example, using a pin 762. As will be further described, rotation of motor 200 can apply a downward biasing force on collective control 10. Any suitable motor may be used such as, for example, a gear motor.

Referring to FIG. 11, collective control 10 is shown in an uppermost, fully raised position. Disk 740 is oriented having pivot point 743 at an uppermost position such that actuator spring arrangement 746 does not apply a downward biasing force to the collective control. If the pilot moves the collective downward, crown 730 moves downwardly away from lever arms 720*a* and 720*b*, as counterbalance spring 714 is compressed by the pilot, such that the emergency collective actuator has no effect on the pilot's actuation. It is noted that the pilot can lower the collective from any given position above minimum with no influence from the emergency collective actuator, since crown 730 moves downward and away from lever arms 720*a* and 720*b*. The emergency collective actuator arrangement may readily configured to overcome a collective friction setting that is intended to prevent inadvertent movement of the collective, for example, if it is necessary for the pilot to move his or her hand away from the collective control.

Figure 13:
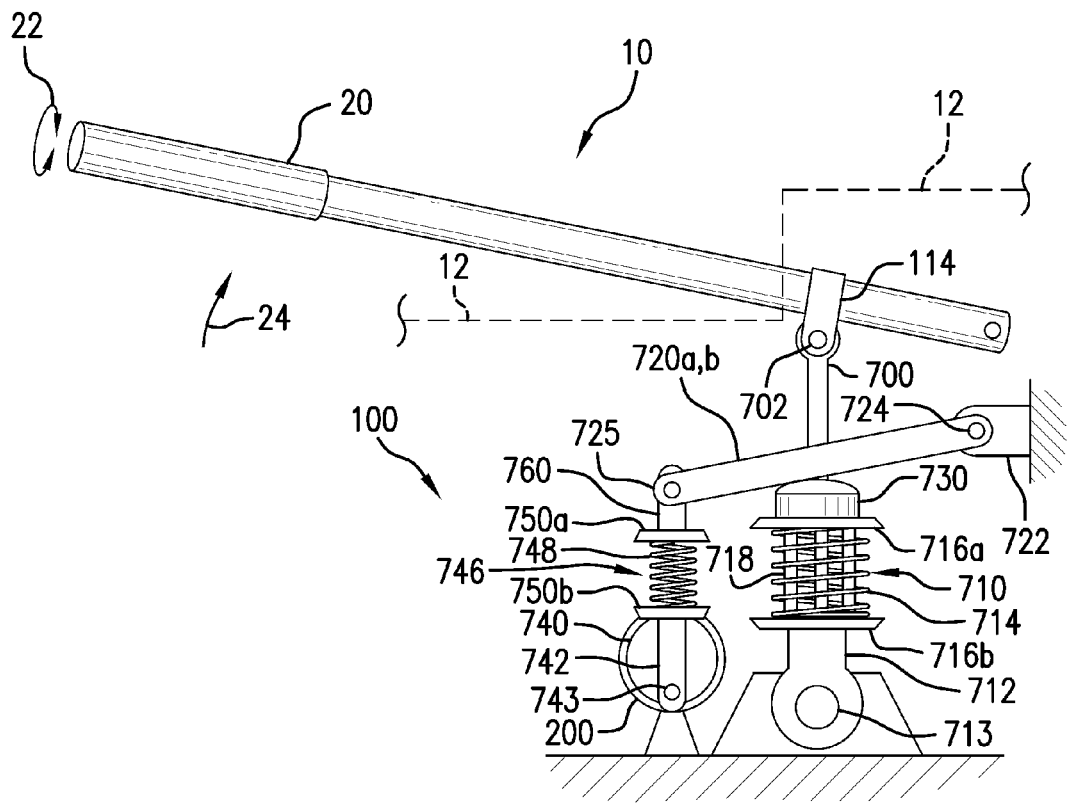
FIG. 13 is a diagrammatic view, in elevation, showing the embodiment of the emergency collective actuator of FIG. 11, but with the emergency collective actuator in an engaged mode having lowered the collective control.

FIG. 13 diagrammatically illustrates the collective control and emergency collective actuator after having fully lowered the collective as a result of motor 200 rotating disk 740 such that pivot point 743 is at a lowermost position. As disk 740 is rotated, which can take place either clockwise or counter clockwise, actuator spring arrangement 746 pulls downward on ends 725 of lever arms 720*a* and 720*b*. The lever arms, in turn, engage crown 730 so as to compress counterbalance spring 714 and thereby lower the collective. Motor 200 can rotate another 180 degrees in either direction to release the collective, for example, after a predetermined time interval.

Referring to FIGS. 4, 11 and 13, control section 300 can be configured in one embodiment with a microcontroller that is configured to generate a first pulse at $t_1$ having a duration which rotates disk 740 by 180 degrees from the position in FIG. 11 to the position in FIG. 13. At $t_x$, the microcontroller can generate a second pulse having a duration which rotates disk 740 by 180 degrees from the position in FIG. 13 to the position in FIG. 11. Thus, the motor drive signal can be made up of these two pulses that are represented by dashed lines 764 which represent the trailing edges of the pulses, as shown in motor drive plot 420 of FIG. 4. As part of this embodiment, the flow diagram of FIG. 5 may be modified such that step 516 drives motor 200 to move pivot point 743 to its lowermost position so that the emergency collective actuator is able to lower the collective in an engaged mode. Step 520, on the other hand, rotates the motor to position pivot point 743 at its uppermost position to disengage the emergency collective actuator in a disengaged mode. Step 522 likewise drives the motor to position pivot point 743 at its uppermost position to disengage the emergency collective actuator, if necessary.

Figure 14:
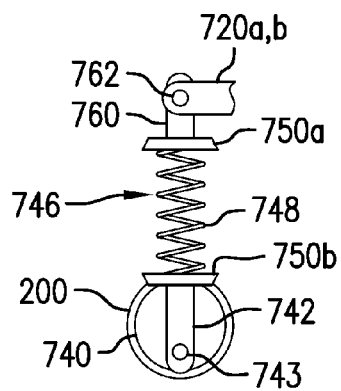
FIG. 14 is a partially cut-away diagrammatic view, in elevation, of the emergency collective actuator as shown in FIG. 13, but showing the condition of the mechanism when the pilot counteracts an actuation by the emergency collective actuator.

FIG. 14 diagrammatically illustrates the appearance of a relevant portion of emergency collective actuator 10 in the case where the pilot is moving the collective upward, thereby counteracting the emergency collective actuator which has previously lowered the collective, as evidenced by pivot point 743 being located in its lowermost position. The actuation by the pilot causes actuator spring 748 to extend such that ends 725 of lever arms 720*a* and 720*b* rotate in a clockwise direction. It is noted that the length of the collective arm provides the pilot with significant leverage for purposes of causing the extension of the actuator spring. It is considered that the configuration that has been shown by way of example may be modified by one having ordinary skill in the art in a wide variety of ways while remaining within the scope of these teachings.

Figure 15:
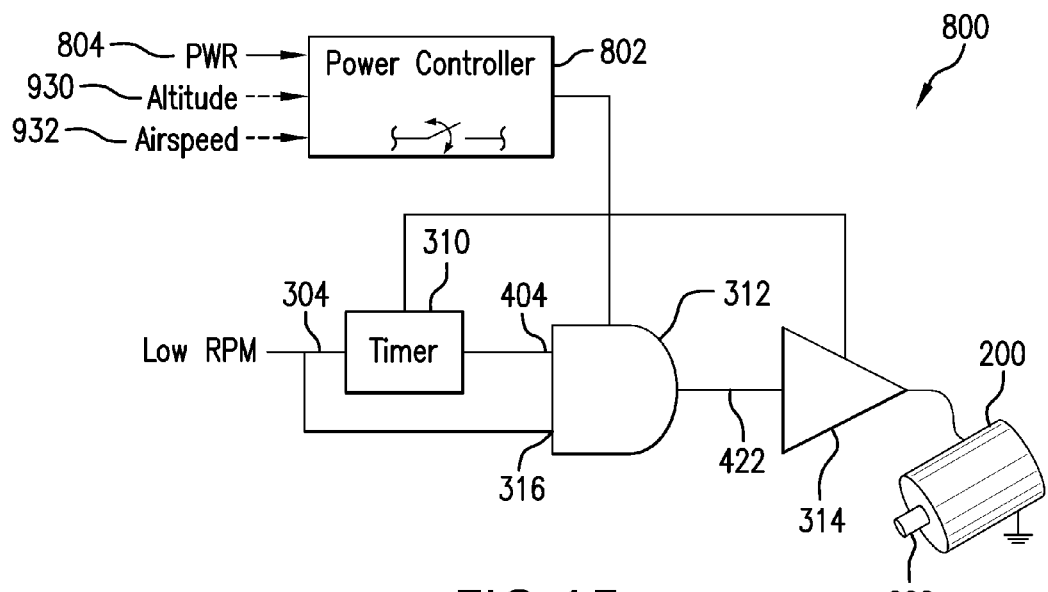
FIG. 15 is a block diagram showing another embodiment of a control section which can form part of the emergency collective actuator of the present disclosure.

FIG. 15 is a block diagram illustrating another embodiment of an emergency collective actuator that is generally indicated by the reference number 800. Embodiment 800 shares many of the components described above with reference to embodiment 300 of FIG. 3. In this embodiment, however, timer 310, AND gate 312 and driver 314 receive electrical power from a power controller 802 via a power line 804. In one embodiment, power controller 802 can be an electrical switch such as, for example, a toggle switch that is mounted for actuation by the pilot. The pilot can therefore selectively use the switch to disable the emergency collective actuator, for example, when performing low altitude maneuvering or hovering at which there is insufficient altitude for purposes of autorotation. In such an instance, as discussed above, the pilot should react by increasing the collective and allow the helicopter to settle to the ground, using inertia that is present in the rotor system.

Figure 16:
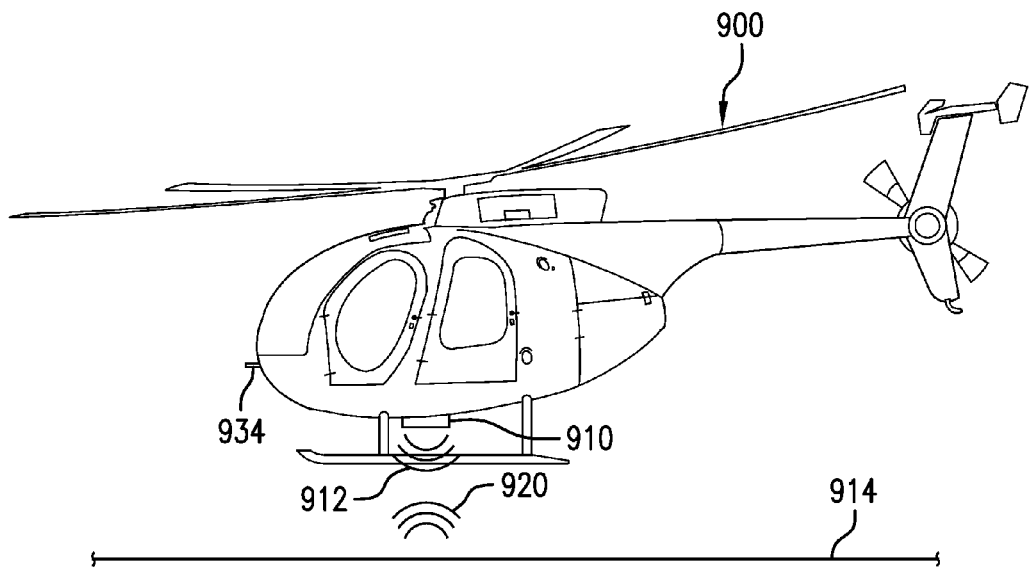
FIG. 16 is a diagrammatic view, in elevation, showing a helicopter which includes an embodiment of the emergency collective actuator of the present disclosure in which at least ground proximity detection is used for purposes of controlling the emergency collective actuator of the present disclosure.

Turning to FIG. 16 in conjunction with FIG. 15, the former is a diagrammatic plan view of a helicopter 900 using another embodiment of the emergency collective actuator in which power controller 802 is used with a ground proximity detection unit 910. In one embodiment, the ground proximity detection unit transmits a radar signal 912 that is used to detect the immediate distance to a surface 914 of the ground based on a reflected signal 920. Controller 802 can be configured to automatically disconnect output power from timer 310, AND gate 312 and driver 314, and/or one or any combination of these components, below some predetermined altitude such as, for example, twenty feet. Controller 802 can receive a signal from the ground proximity detection unit on an altitude input 930 (shown as a dashed line). In another embodiment, controller 802 can additionally be configured with an airspeed input 932 (shown as a dashed line) to receive the airspeed from an airspeed sensor 934 on the helicopter so as to use both altitude and airspeed to determine an appropriate combination of minimum altitude and minimum velocity below either of which the emergency collective actuator is automatically disabled. It should be appreciated that sufficient forward speed would increase the appropriate low altitude to some degree by providing the capability to contribute inertia to the rotor system. In one implementation, lookup tables based on combinations of airspeed and altitude can be formulated and stored in controller 802 based on the height-velocity diagram for a given helicopter in which the system is to be installed. Power controller 802 can then operate in accordance with altitude 930 and airspeed 932 inputs based on the lookup table(s). It should be appreciated that helicopter manufacturers routinely generate height-velocity diagrams for their helicopters. Such diagrams illustrate regions of safe and unsafe operation. Generally, as altitude increases, forward airspeed becomes relatively less critical. In one embodiment, the emergency collective actuator can be disabled from lowering the collective when detected altitude and airspeed indicate that the helicopter is operating within one or more predetermined unsafe regions of the height-velocity diagram for that helicopter. Generally, a predetermined unsafe region can be considered to include the border of that region although an additional safety margin could be included which would slightly expand one or more of the predetermined unsafe regions. In any embodiment for which controller 802 provides for automatic operation, input power for the controller can be provided via a switch that is inserted in a series connection in power line 804 such that the pilot can manually actuate the switch to disable or enable automatic operation of controller 802.

Figure 17:
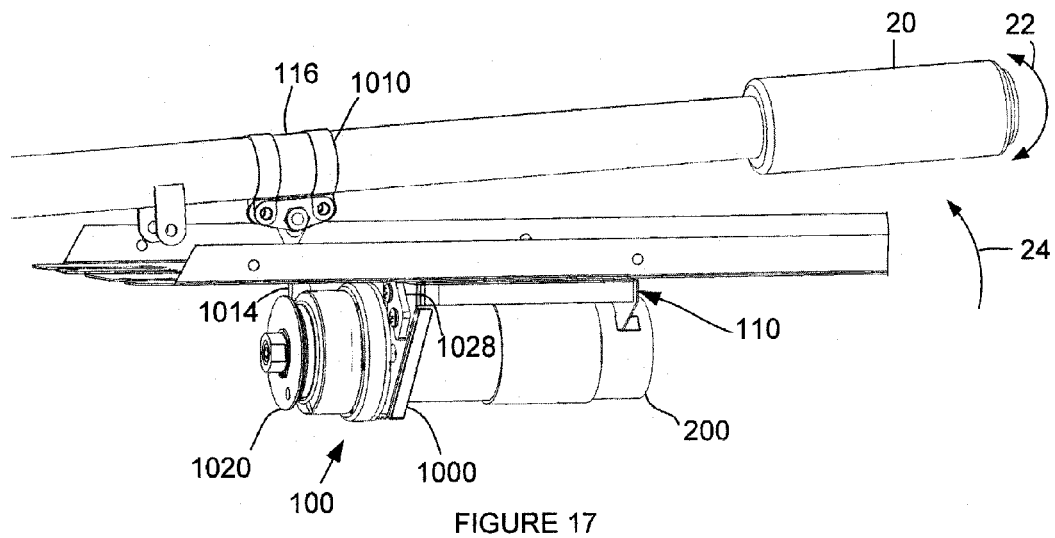
FIG. 17 is an installed diagrammatic perspective view of another embodiment of the emergency collective actuator of the present disclosure, shown here with a collective control of the helicopter in a fully lowered position.
Figure 18:
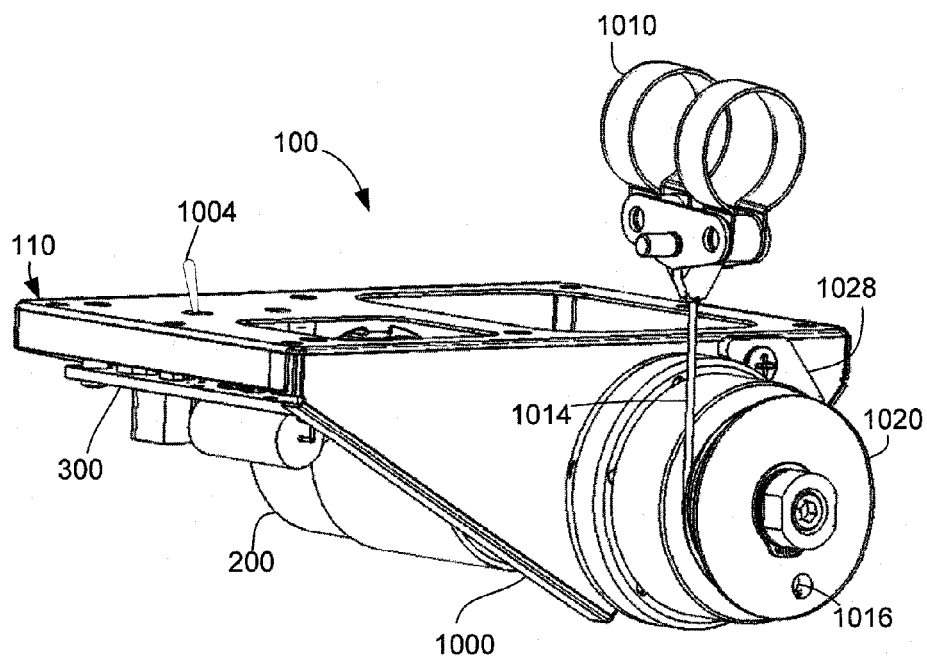
FIG. 18 is a diagrammatic perspective view of the embodiment of the emergency collective actuator of FIG. 17 shown in a further enlarged view in isolation from the helicopter, but corresponding to the fully lowered position of the collective.

Attention is now directed to FIGS. 17 and 18 which illustrate yet another embodiment of emergency collective actuator 100 in a partial perspective views. Main unit 110 includes a frame 1000 that can be formed, for example, from aluminum. The frame is mounted, for example, on floor panel 12 and supports motor 200. As seen in FIG. 18, frame 1000 also supports control section 300. A toggle switch 1004, by way of non-limiting example, can be provided to allow the pilot to enable/disable the main unit. A clamp arrangement 1010 is attached to intermediate position 116 on the collective and engages one end of a flexible cable 1014. At least a portion of the cable proximate to an opposite end 1016 is received around a cable drum 1020. In the present embodiment, the opposite end of cable 1014 receives a ball end (only partially visible in FIG. 18) that can be fixedly attached to the cable end, for example, by swaging. FIGS. 17 and 18 correspond to the collective in a fully lowered position which results in a minimum collective pitch setting that is available for the rotor system of the helicopter.

FIGS. 19 and 20 are partial perspective views that correspond at least generally to the perspective views of FIGS. 17 and 18, respectively, but which show collectively 20 in a fully raised, maximum collective pitch setting for the rotor system of the helicopter. Thus, a relatively longer length of cable 1014 is unwrapped from cable drum 1020 in FIGS. 19 and 20 as compared to FIGS. 17 and 18. It is noted that collective handle 20 has been rendered as transparent in the further enlarged views of FIGS. 18 and 20 due to illustrative constraints. Further details will be provided immediately hereinafter with regard to the operation of the cable drum and associated components.

Figure 21:
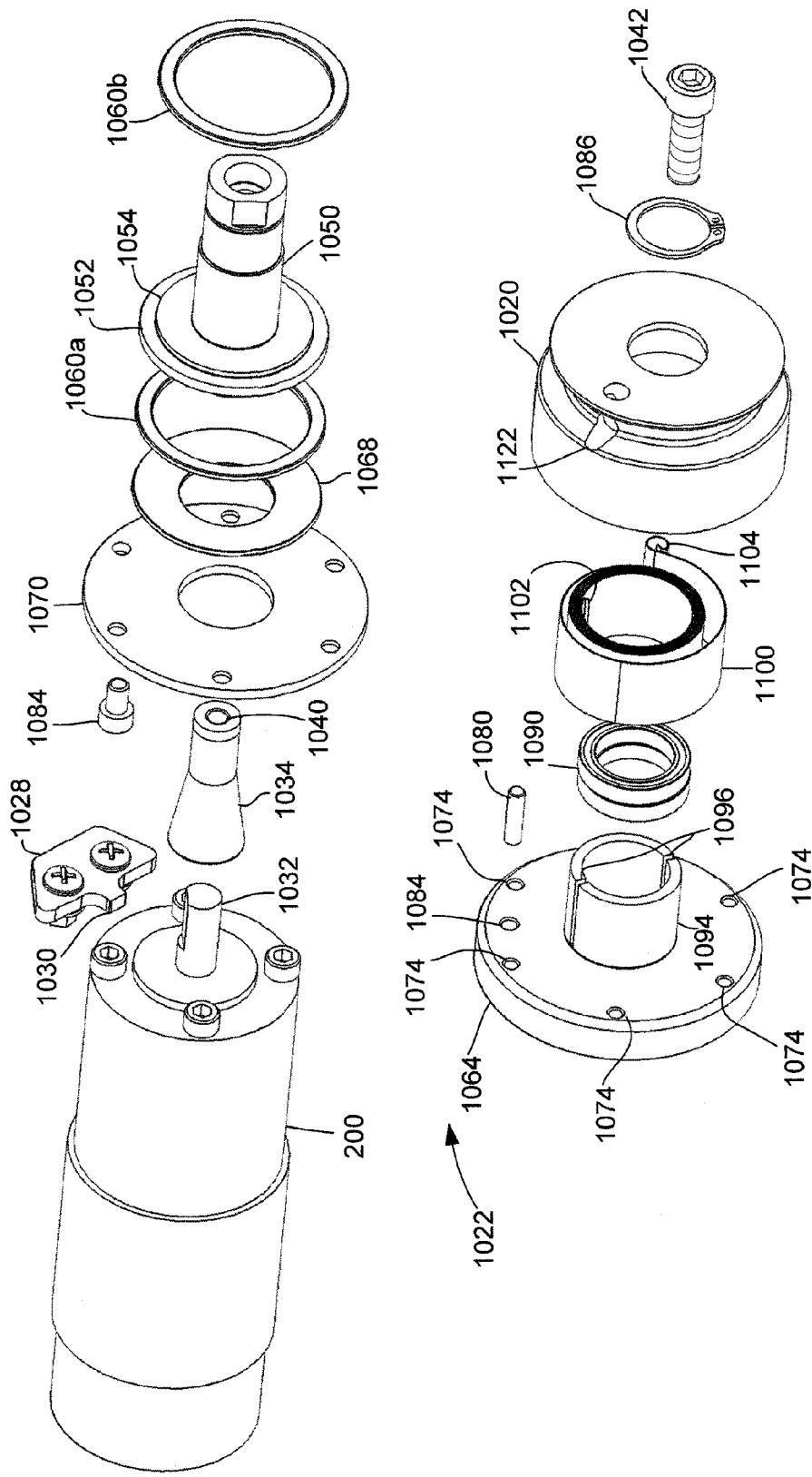
FIG. 21 is a diagrammatic exploded view, in perspective, of the embodiment of the emergency collective actuator of FIGS. 17-20.

Referring to FIG. 21, a perspective view is provided including motor 200, as seen in association with an exploded, perspective view of an embodiment of a clutch arrangement 1022 which itself supports an embodiment of cable drum 1020. A stop bracket 1028 including a stop prong 1030 can be mounted to frame 1000 (also see FIGS. 17-20), for example, using a pair of threaded fasteners. Motor 200 includes a motor shaft 1032. Initial descriptions will focus on components that always co-rotate with the motor shaft. Accordingly, an intermediate shaft 1034 can include a split end defining a complementary aperture (not shown) for receiving the motor shaft and an outer conical surface having a conical portion to provide for clamping engagement of the split end against the motor shaft, as will be described. An outer end of intermediate shaft 1034 can define a threaded opening 1040 that is configured to receive a bolt 1042. In the final assembly, a clutch shaft 1050 including a clutch disk 1052 is received on intermediate shaft 1034 and includes an interior surface that is complementary to the outer conical surface of the intermediate shaft. Bolt 1042, when tightened, biases clutch shaft 1050 against the conical surface of the intermediate shaft such that the split end of the intermediate shaft clamps against the motor shaft.

Still referring to FIG. 21, the clutch arrangement includes a pair of friction rings 1060a and 1060b that are received against opposing shoulders 1054 (only one of which is visible) defined by clutch disk 1052. A clutch drum 1064 defines an interior groove (not shown) that receives friction ring 1060b. On the opposite side of the friction plate, a Belleville washer 1068 is biased against friction ring 1060a by a clutch housing plate 1070. The latter can be secured to clutch drum 1064 by a plurality of fasteners that extend through openings in the clutch housing plate and into threaded openings 1074 in the clutch drum. Thus the clutch drum assembled to the clutch plate uses Belleville washer 1070 to resiliently capture the friction rings against the clutch disk with the clutch drum and clutch plate supported for relative rotation around clutch disk 1052. A dowel 1080 is received in an opening 1082 that is defined by clutch drum 1064. A stop pin 1084 can serve as one of a number of fasteners for securing the clutch plate to the clutch drum and additionally includes a head for engaging against the side margins of stop prong 1030. It is noted that the remaining fasteners (not shown) for securing the clutch plate are of a lower profile and do not include a head that is configured to engage the stop prong. As will be further described, the clutch arrangement provides a breakaway force that allows motor 200 to readily retract the collective, but also readily allows the pilot to resist the actuation force from the motor by causing the friction rings of the clutch arrangement to slip against clutch disk 1052. A snap ring 1086 can hold cable drum 1020 on clutch shaft 1050. It is noted that the components of the clutch arrangement of FIG. 21 can be formed from any suitable material including but not limited to aluminum and stainless steel, as will be readily apparent to those of ordinary skill in the art.

Figure 23:
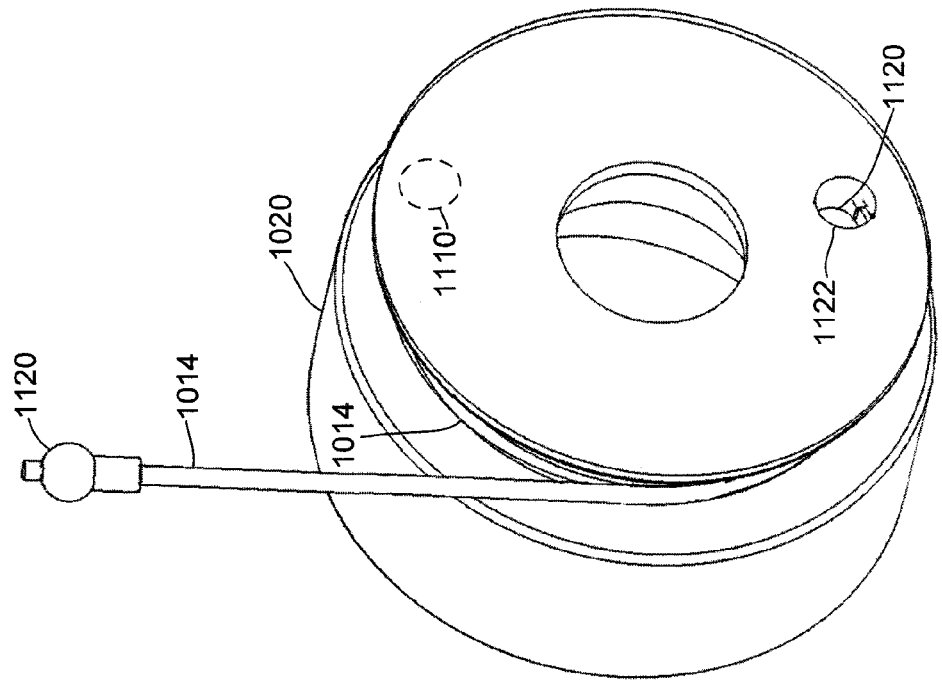
FIG. 23 is another diagrammatic perspective view which illustrates further details with respect to the embodiment of the cable drum of FIG. 22.
Figure 22:
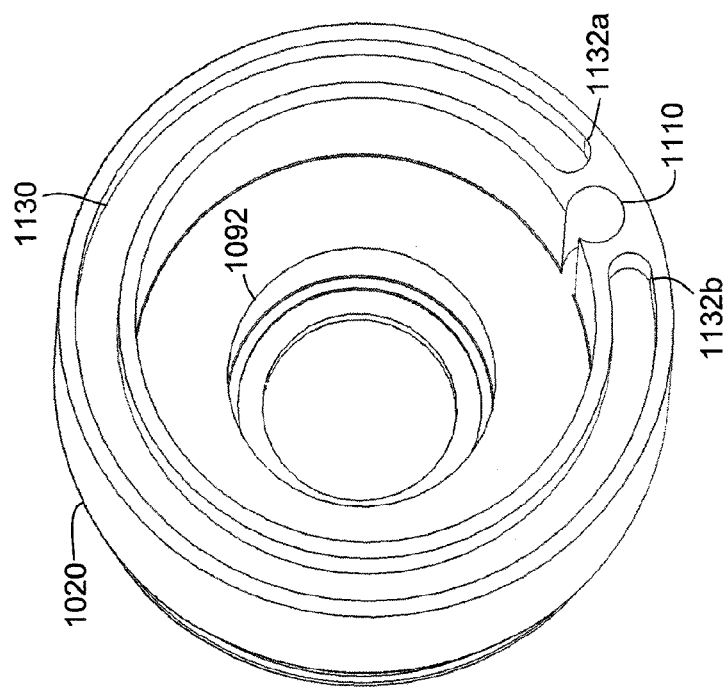
FIG. 22 is a diagrammatic perspective view which illustrates further details with respect to an embodiment of a cable drum that forms a portion of the embodiment of the emergency collective actuator.

Referring to FIGS. 22 and 23 in conjunction with FIG. 21, a pair of bearings 1090 can be received on clutch shaft 1050 for rotationally supporting cable drum 1020. The cable drum receives bearings 1090 within a cavity 1092 of the cable drum which is seen in FIG. 22, showing an embodiment of the interior configuration of the cable drum. A collar 1094 can be integrally formed with clutch drum 1064 and projects outwardly therefrom. The collar can define a pair of opposing slots 1096. A constant force spring 1100 includes an inside diameter that is receivable on collar 1094 and includes an inside end tab 1102 that is receivable in one of slots 1096. An opposing, outer end of spring 1100 can include a rolled end 1104. Cable drum 1020, when supported by bearings 1090, interiorly receives spring 1100 having rolled end 1104 received in a groove 1110 (FIG. 22) that can be cylindrical in configuration. A dashed circle 1110' (FIG. 23) is a projection of the cylindrical groove onto the end surface of the cable drum to show its relative position. Thus, rotation of the cable drum in a counterclockwise direction relative to clutch drum 1064, in the view of FIG. 21, results in compressing or winding constant force spring 1100. As seen in FIG. 23, cable 1014 is partially wound around the cable drum and a suitable fitting such as, for example, a ball 1120 can be fixedly attached to each end of the cable. As seen in FIG. 21, cable drum 1020 can define a passage 1122 having an enlarged end opening for initially receiving ball 1120. The ball is then moved outward into the length of the passage to a captured position, as illustrated by FIG. 23. As seen in FIG. 22 and as will be further described, cable drum 1020 defines a channel 1130 that is at least generally circular and which defines opposing first and second channel ends 1132a and 1132b, respectively. When the cable drum is assembled against clutch drum 1064, an outward end of dowel 1080 is received in channel 1130 such that channel ends 1132a and 1132b serve as end stops with respect to the travel of the dowel in the channel.

Attention is now directed to FIGS. 24a-24d which are diagrammatic end view illustrations, based on the emergency collective actuator embodiment of FIGS. 19-23, that are limited to showing the relationship between stop prong 1030 of stop bracket 1028, stop pin 1084 and dowel 1080 in different operational states. Initially, in FIG. 23, the emergency collective actuator is shown with the collective in the full up position of FIGS. 19 and 20 having the emergency collective actuator in an inactivate or neutral state such that there is no discernable influence on the pilot's choice of collective setting. The emergency collective actuator, however, is ready to lower the collective in the event that a low RPM signal is received. In this state, cable 1014 (see FIGS. 19 and 20) is unwound to a maximum extent from cable drum 1020 through clockwise rotation which winds constant force spring to experience its maximum operational tension. At the same time, dowel 1080 is positioned against or nearly against first end 1132a of channel 1130 while stop pin 1084 is engaged against a first side of stop prong 1030. It should be appreciated that the position of stop pin 1084 is indicative of the operational status of the emergency collective actuator. In FIGS. 24a, 24b and 24c, the stop pin being biased against the first side of the stop prong indicates that the emergency collective actuator is in the inactive or neutral state. If the stop pin is engaged against a second, opposite side of the stop prong as seen in FIG. 24d, the emergency collective actuator is in an actuated state and has at least attempted to pull down the collective to the minimum position shown in FIGS. 17 and 18.

Referring to FIG. 24b and as noted above, the emergency collective actuator is shown in its inactive state but remains ready to pull down the collective as is evidenced by the position of stop pin 1084. The collective has been lowered to some extent by the pilot, as compared to FIG. 24a, such that constant force spring 1100 (FIG. 21) rotates cable drum 1020 counterclockwise, as indicated by an arrow 1200, to take up slack in the cable. At the same time, channel 1130 rotates with the cable drum such that dowel 1080 is moved away from first end 1132a of the channel and toward second end 1132b. If the pilot continues to lower the collective to its minimum position, dowel 1080 will be received against or nearly against second end 1132b of the channel as illustrated by FIG. 24c.

FIG. 24d diagrammatically illustrates the emergency collective actuator after having been triggered by a low RPM signal to rotate the clutch arrangement counterclockwise in the direction of arrow 1200 such that stop pin 1084 is received against a second, opposite side of stop prong 1030. At some point during the clutch rotation, which depends on the current pilot selected position of the collective control, dowel 1080 can engage first end 1132a of groove 1130 to then rotate the clutch drum in a way that winds cable 1014 (see FIGS. 18 and 23) onto the cable drum and pulls down the collective. Even if the collective is already fully lowered, the mutual relationships between the various components will be achieved as illustrated by FIG. 24d. Once the collective is pulled down or at any time during the actuation that is intended to pull down the collective, the pilot can pull the collective up to overcome the actuation force which can cause the clutch arrangement to slip, thereby allowing rotation of cable drum 1020 in a clockwise direction, opposite arrow 1200.

The clutch arrangement of FIGS. 17-24, utilizes resilient biasing to eliminate cable slack while allowing the pilot to operate the collective during normal operational conditions. When the emergency collective actuator is actuated, the pilot is able to overcome the actuation force via clutch slippage. In some embodiments, a rigid linkage can be used without the need for a flexible cable. Accordingly, the rigid linkage can be pivotally connected, for example, to clutch drum 1064.

FIG. 25 illustrates another embodiment of emergency actuator 10 which can be understood based on the descriptions of FIG. 2 appearing above. For this reason, the present descriptions are limited to describing the various ways in which the present embodiment differs from the embodiment of FIG. 2. In particular, a modified cable drum 204' has been provided that is not cylindrical, but rather is frustoconical in form. Cable 112 passes around an idler 1300 and is received in a spiral groove 1302. One end of the cable can be fixed within groove 1302, for example, by a fastener 1303. When motor 200 rotates drum 204' in a direction indicated by an arrow 1304, cable 112 is taken up in groove 1302 to retract or lower collective 20. The present embodiment is different from the embodiment of FIG. 2, however, at least to the extent that as the retraction progresses, the rate of retraction decreases. It should be appreciated that the specific shape of the spiral groove in the sidewall can be configured to cooperate with the shape of the sidewall of the drum itself to provide a wide range of customized retraction rate profiles and is not limited to a continuous decrease in the rate of retraction. That is, the retraction rate can decrease and/or increase in any suitable manner as the retraction progresses. In an embodiment, the drum and spiral groove can be configured to provide for retraction in less than one full revolution of the drum. In another embodiment, the retraction rate can be customized by using the embodiments of FIG. 2 or 17 while providing a variable drive signal to motor 200. For example, motor drive rate profiles 1310 can be stored in electronic control section 300. In this case, motor 200 can be a geared servo motor or other suitable type of motor.

While a number of exemplary aspects and embodiments have been discussed above, those of skill in the art will recognize certain modifications, permutations, additions and sub-combinations thereof. For example, in an embodiment, the low RPM signal can be generated based on the engine RPM. As shown in FIG. 3, a comparator 1400 (shown in phantom using dashed lines) can monitor the engine RPM based on a predetermined engine RPM threshold to generate the low RPM signal at the output of the comparator that is used in FIG. 4. The RPM engine threshold can be customized in view of a given helicopter. In this way, at least some degree of even faster system response can be achieved. It is therefore intended that the following appended claims and claims hereafter introduced are interpreted to include all such modifications, permutations, additions and sub-combinations as are within their true spirit and scope.

What is claimed is:

1. For use with a helicopter including a rotor system having a main rotor with an adjustable pitch that is controlled at least in part by a pilot using a collective control, an apparatus comprising:
   an actuator arrangement including a motor having an output shaft for rotation to change the adjustable pitch by exerting an actuation force and a clutch supported by the output shaft and in operative communication with the collective control such that the clutch slips relative to the output shaft to allow the pilot to overcome said actuation force using the collective control but otherwise the clutch co-rotates with the motor shaft to bias the adjustable pitch toward a minimum collective pitch position; and
   a control arrangement that is configured to receive a signal that is indicative of a low rotor RPM condition and to respond to said signal by activating the actuator arrangement to exert the actuation force.

2. The apparatus of claim 1 wherein the clutch includes a clutch disk that is supported by the output shaft to co-rotate therewith and a clutch assembly supported by the clutch disk and configured (i) to co-rotate with the clutch disk to serve in transferring the actuation force to reduce the adjustable pitch and (ii) to slip relative to the clutch disk responsive to an application of a counterforce applied by the pilot to the collective control such that the counterforce overcomes the actuation force.

3. The apparatus of claim 2 wherein the clutch assembly includes a clutch housing that defines a clutch housing interior that receives said clutch disk with the clutch housing supported by said clutch disk.

4. The apparatus of claim 1 wherein said control arrangement is further configured to selectively apply the actuation force for a predetermined period of time having a limited duration responsive to receiving said signal.

5. The apparatus of claim 4 wherein said control arrangement is configured to enter a lockout interval immediately following said predetermined period of time during which lockout interval the signal is disabled from activating the actuator arrangement.

6. The apparatus of claim 1 wherein said collective control includes an arm that is pivotable to change the adjustable pitch of the rotor and said arm includes an arm length extending from a pivot end to a distal end and wherein said actuator arrangement is connected to an intermediate position along the arm length to apply said actuation force.

7. The apparatus of claim 6 positioned below said collective control such that said actuation force pulls on said collective control from said intermediate position.

8. The apparatus of claim 7 wherein said actuator arrangement includes a cable having a distal end that is attached to the intermediate position of the arm length for pulling on the collective control to decrease the adjustable pitch.

9. The apparatus of claim 8 wherein the motor is an electric motor for applying said actuation force via the cable by rotating in a given direction.

10. The apparatus of claim 9 wherein said clutch assembly is operatively coupled to a cable drum that is supported for coaxial rotation with said clutch disk and configured for attachment to a proximate end of said cable such that a proximate end portion of said cable extends at least partially around the cable drum.

11. The apparatus of claim 10 wherein said cable drum is resiliently coupled to said clutch assembly by a constant force spring that applies a resilient bias to the cable at least to take up slack in the cable.

12. The apparatus of claim 11 wherein said clutch assembly is rotatable by said motor between a deactivated position at which the actuation force is not applied and an activated position such that rotation of the cable drum from the deactivated position to the activated position retracts the cable to apply the actuation force as needed to move the collective control to the minimum collective pitch position in the absence of a counteracting force from the pilot.

13. The apparatus of claim 12 wherein said deactivated position and said activated position are rotatably spaced apart by less than one full rotation of the clutch assembly.

14. The apparatus of claim 12 wherein said constant force spring applies a resilient bias to the cable to take up slack in the cable with the clutch assembly in the deactivated position.

15. The apparatus of claim 14 wherein said cable drum defines an arcuate groove that receives a clutch pin that is supported by said clutch assembly and, with the clutch assembly in the deactivated position, said cable drum rotates having the clutch pin received in the arcuate groove to provide for a full range of collective control actuation by the pilot as the constant force spring applies said resilient bias to the cable.

16. The apparatus of claim 15 wherein said clutch assembly includes a pair of friction rings arranged on a pair of opposite sides of a clutch disk and said clutch assembly resiliently biases the friction rings against the opposite sides of the clutch disk.

17. The apparatus of claim 15 wherein said arcuate groove includes opposing first and second ends and responsive to rotation of the clutch assembly to the activated position the clutch pin engages the first end of the arcuate groove to rotate the cable drum and thereby retract the cable, as needed, onto the cable drum to bias the adjustable pitch into the minimum collective pitch position.

18. For use with a helicopter including a rotor system having a main rotor with an adjustable pitch that is controlled at least in part by a pilot using a collective control, a method comprising:
   receiving an electrical signal that is indicative of a low rotor RPM condition; and
   responding to said electrical signal by driving a motor having an output shaft to exert an actuation force by automatically changing the adjustable pitch to exert the actuation force through a clutch such that the pilot is able to overcome said actuation force using the collective control by causing the clutch to slip relative to the output shaft but which actuation force is otherwise applied by co-rotation of the clutch with the output shaft to bias the adjustable pitch toward a minimum collective pitch position.

* * * * *